INVENTORS:-
George E. Schmitkons
Harold B. Ketchum, Jr.
BY Vandeveer Voorhees
ATTORNEY Patented Sept. 7, 1954

2,688,401

UNITED STATES PATENT OFFICE 2,688,401

FLOTATION OF ACTIVE CATALYST FROM SPENT CATALYST

George E. Schmitkons, Flossmoor, Ill., and Harold B. Ketchum, Hammond, Ind., assignors to Standard Oil Company, Chicago, Ill., a corporation of Indiana Application September 29, 1949, Serial No. 118,666

12 Claims. (Cl. 209—172)

This invention relates to the treatment of hydrocarbon conversion catalysts and more particularly to the separation from used catalysts of inactive and active particles. Still more particularly the invention relates to the separation of inactive particles from finely divided cracking catalysts typified by activated clays, acid-treated montmorillonite, and synthetic oxide catalysts such as silica-alumina and silica-magnesia.

Figure 1:
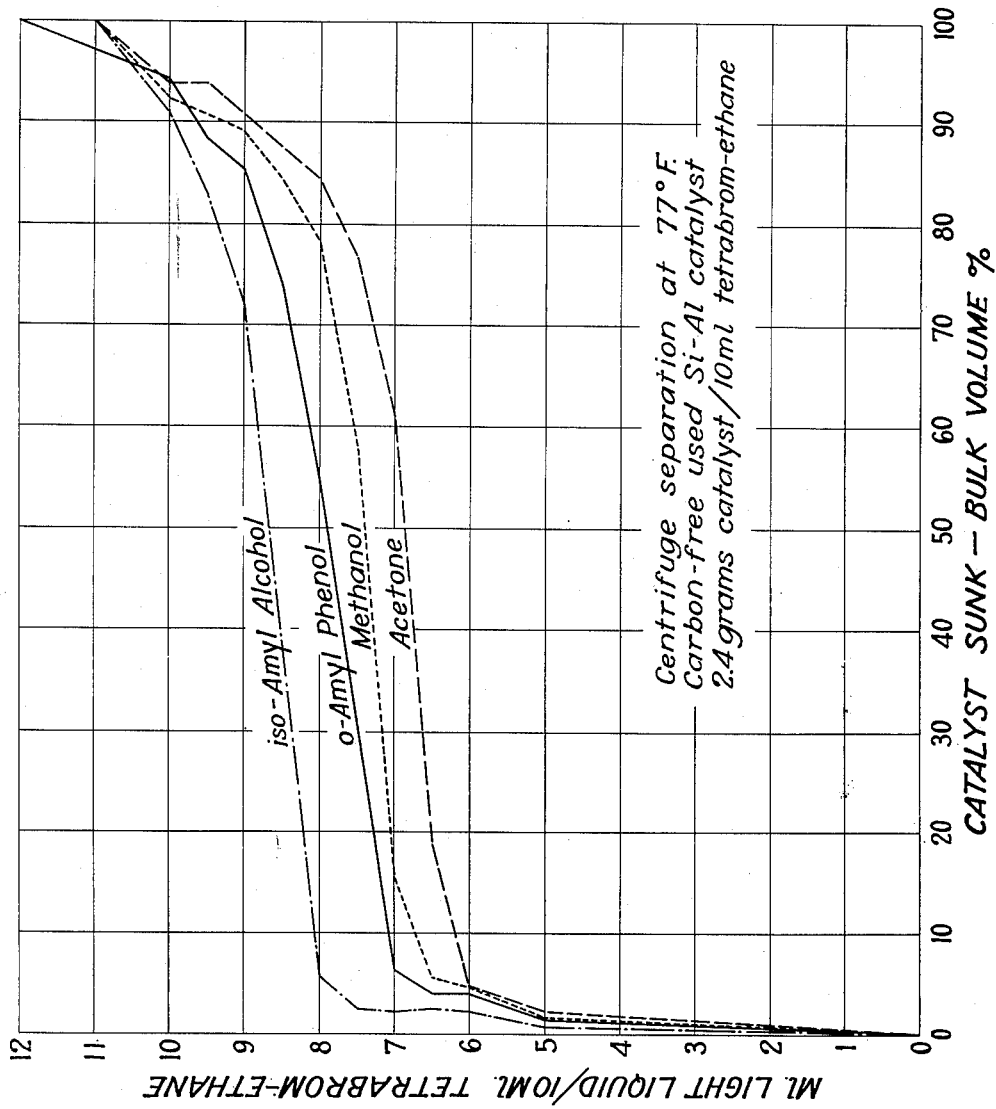
Figure 2:
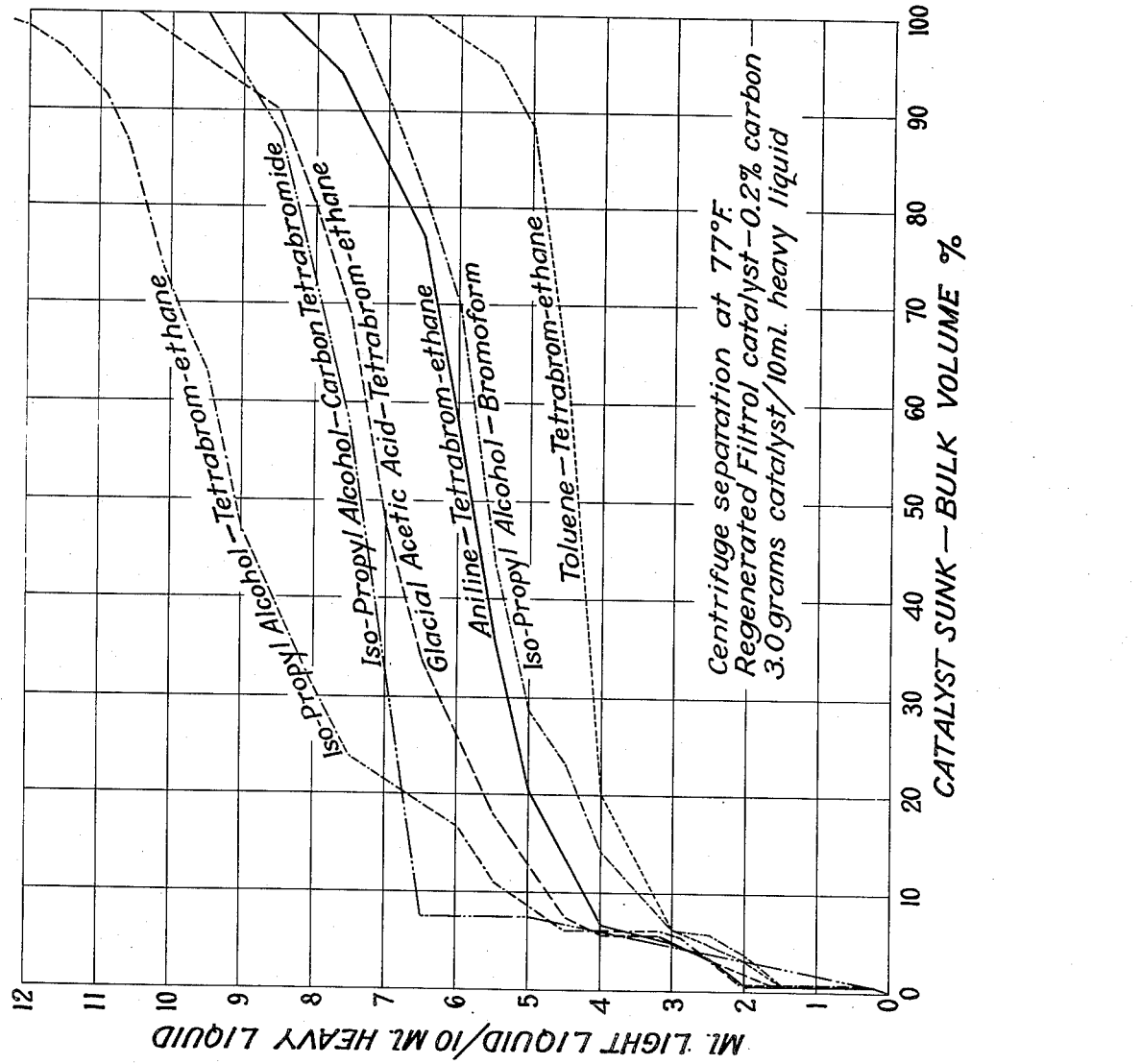

The drawings, Figures 1 and 2, present in graphical form, data illustrating the results obtained in applying the invention to typical cracking catalysts.

In the catalytic conversion of hydrocarbons as in catalytic cracking and hydroforming, the catalyst, in contact with the hydrocarbon, e. g. heavy naphtha, gas oil, etc., at high temperatures becomes temporarily inactivated due to the deposition of carbonaceous substances which are periodically removed by burning in the so-called regeneration stage of the process. After numerous regenerations and recycling to contact additional hydrocarbon, it is characteristic of catalysts of this type to suffer a general loss of activity which is not restored by the regeneration procedure. To compensate for this permanent loss in activity, fresh catalyst is periodically added to the body of catalyst in the process. This addition of fresh catalyst may replace or make up for catalyst lost in the operation, but where the amount of fresh catalyst required for make-up to replace lost catalyst is insufficient to sustain the desired activity level, it is usually necessary to withdraw and discard catalyst from the system in order to allow greater amounts of fresh catalyst make-up to be added. This is particularly applicable to the cases of moving bed and fluidized catalyst operations in which adjustment of fresh catalyst make-up rate is a convenient means for maintaining conversion substantially uniform in order to keep the process in balance from the standpoint of operating efficiency. In the case of the fixed-bed type of process, it is usually more economical to discard an entire batch of the catalyst and recharge when conversion rates fall below an economically practical level.

As fresh catalyst is added periodically to circulating catalyst in a fluid-catalyst or moving-bed type cracking unit, the catalyst mass becomes more and more inhomogeneous with respect to the specific activity of individual particles, because all the particles become progressively less active with age in the unit. Inasmuch as the circulating catalyst in a typical cracking unit contains particles covering the whole range of ages from very old to quite fresh, the activities of individual particles will range from substantially zero activity (dead) to the high activity of most recently added fresh catalyst.

Heretofore when catalyst was discarded because of diminished activity from units which have had periodic additions of fresh catalyst, only a minor proportion of the discarded particles was completely dead or had an activity less than 10 per cent of the average activity. One purpose of our invention is to separate from such discarded catalyst a low-activity fraction and thereby effect a considerable saving in the catalyst which is normally wasted, since the recovered more-active catalyst particles can be returned to the conversion process. The economic saving can be realized either by decreased make-up with fresh catalyst or by increased activity of circulating catalyst or both. Another object of our invention is to provide economic incentive to reduce normal losses of catalyst, such as loss of fines produced by attrition, so that fresh catalyst make-up may be further decreased. In the absence of means to preferentially discard the lowest activity particles, attrition rates and stack losses of fines are often allowed to increase to the point where no withdrawal discard is necessary to maintain activity. Other advantages will be apparent hereinafter.

We have discovered that this separation can be effected by means of the difference in density of the active and inactive particles, the inactive or dead particles usually having a higher effective density, making it possible to separate them by suspension in a liquid medium of appropriate composition and adjusted density so that the dead and lowest activity particles sink and the live particles float.

Separation may be effected in various ways following the foregoing principle. The catalyst of mixed activity may be agitated with a liquid of appropriate composition and of selected density lying between the effective immersed densities of the dead particles and the moderately active catalyst particles and the slurry passed to a settling chamber such as a Dorr thickener where the dead and lowest-activity particles are permitted to settle while the more active catalyst particles are floated off and conducted to a separator for recovering the liquid adhering to the catalyst. The sunk fraction is also processed to recover adhering liquid which may be recycled in the operation.

Liquids suitable for effecting separation between active and inactive catalyst particles are preferably mixtures of two miscible organic solvents comprising a heavy compound, such as a brominated or iodinated hydrocarbon, and a lighter compound for adjustment of density. For the separation of a low-activity fraction from used Super Filtrol catalyst, we can use a separating liquid having a density in the range of about 2.4 to 2.5 grams/ml. This may be obtained by mixing two solvents, for example acetylene tetrabromide 67 to 60 per cent by volume and carbon tetrachloride 33 to 40 per cent by volume. Methylene bromide can be used without addition of a second liquid to adjust density, since its density is about 2.5 grams/ml. at room temperature. Other water-immiscible solvents such as heavy naphtha, benzene, or other hydrocarbon, can be used for reducing density.

The separating liquid can be recovered from the catalyst by evaporation, for example by steaming of the catalyst and condensing the solvent vapors and steam and separating the solvent from the condensed water. It can also be extracted with another solvent, such as alcohol, naphtha, etc. Extraction with excess of the light liquid used in the mixture is particularly effective in achieving negligible loss of the more expensive heavy compound. The solvents are then recycled to the separation stage of the process. Because of the very slight difference in immersed density between active and inactive catalyst particles when the liquid is a single compound or when it is a mixture of closely similar compounds, it is usually desirable with such liquids to apply the separation method just described to a catalyst containing substantial deposits of carbonaceous material acquired in the catalytic conversion operation. The amount of carbonaceous material or so-called "coke" in cracking catalyst usually varies from about 0.2 to 5 per cent on the stripped "spent" catalyst and from about 0.1 to 1.0 per cent on the "regenerated" catalyst. We have found that most of the coke deposited in the catalyst is held in the active catalyst particles and that the dead catalyst particles are relatively free of carbon. Inasmuch as coke has lower density than the mineral portion of the particle skeleton, its presence decreases the density of active particles immersed in a heavy liquid. Adsorbed moisture on the catalyst also accentuates the difference between live and dead catalyst particles with respect to their buoyancy in a water-immiscible solvent such as acetylene tetrabromide.

We have found that the separation of active and inactive catalyst can be further facilitated by the use of a separation liquid composed of a heavy halogenated solvent and an organic oxygenated solvent. Thus a mixture of acetylene tetrabromide, density 2.95 grams/ml., and an alcohol, such as methanol, ethanol, or isopropanol, density 0.78 grams/ml., is very effective. Acetone, furfural, ethyl acetate and similar water-soluble liquids can also be used in combination with a heavy halogenated solvent.

We believe that the oxygenated compound is preferentially adsorbed on the catalyst particles in proportion to their specific activities and because of its relatively low density it enhances the difference in effective density between low and high activity catalyst particles suspended in the separation liquid mixture. The amount of oxygenated compound may be about 5 to 25 per cent by volume of the mixture depending on the catalyst type and the proportion it is desired to sink. When using alcohol as the light component with acetylene tetrabromide for separating used Super Filtrol catalyst, the range of liquid density for 10% sunk to 90% sunk is increased three fold to about 1.84 to 2.21 grams/ml., whereas with carbon tetrachloride as the light component, the density range for 10 to 90 per cent sunk was only about 0.1 grams/ml. from about 2.33 to 2.44 grams/ml. The increase in difference in immersed densities between low and high activity particles permits a more rapid and cleaner separation of a low-activity fraction.

In the case where oxygenated solvents are used as the light component of the separating liquid, we have found it advantageous to operate on regenerated catalyst in which most of the coke has been removed by combustion. The more active particles of catalyst adsorb larger amounts of the low-density oxygen compound, thereby facilitating their separation by the float-and-sink technique. Furthermore, operation on regenerated catalyst instead of heavily coked catalyst avoids the contamination of separation liquid by oil extracted from the "coke."

When operating with separation liquids containing oxygen compounds, several methods may be employed for contacting the catalyst with the components of the separating liquid. Thus, the discarded catalyst may be mixed with the solvent mixture which has been adjusted to a suitable density for the purpose. After thorough mixing, the inactive catalyst drops to the bottom while the active catalyst is removed from the top of the liquid layer. Separation can be speeded by centrifuging. In another method of applying the process, the discarded catalyst may be mixed with the heavy solvent, e. g. acetylene tetrabromide, and the oxygen compound may be added gradually with agitation until the density of the mixture has been reduced to a point which will allow the inactive cataylst particles to fall out of suspension while the active catalyst particles, having adsorbed a substantial amount of the oxygen compound, float to the top and are subsequently separated. It is preferred, however, to employ the reverse procedure, contacting the catalyst first with the oxygenated solvent, e. g. methanol, then adding heavy solvent gradually with agitation until the active catalyst particles are floated.

The following example shows the separation to be expected for various proportions of each of four such light liquids in tetrabromethane for processing used silica-alumina catalyst having an activity of 27.6 IRA. Indiana Relative Activity by the method described in a publication by R. V. Shankland and G. E. Schmitkons—"Determination of Activity and Selectivity of Cracking Catalyst"—Proc. A. P. I. 27 III (1947) Pages 57–77.) The experiment consisted of placing 10 milliliters tetrabromethane (acetylene tetrabromide) and 2.4 grams of the catalyst sample in a centrifuge tube and adding the light liquid by increments. After each increment of light liquid was added, the mixture was agitated to produce a slurry and then whirled in the centrifuge whereupon separation to a sunk and a floated layer with clear liquid between was effected in about two minutes. The bulk volume of catalyst sunk was then read and the process repeated until enough light liquid had been added to sink all of the catalyst. The results are presented in Figure 1.

It is apparent that any of these four combinations of light liquid with the heavy liquid tetrabromethane may be used to separate the catalyst into any proportion sunk that is desired and that the catalyst can be separated into a series of fractions of decreasing immersed particle density.

In another example, choosing methanol as the light liquid, a 2200 gram sample of a similar used catalyst was separated into twelve fractions with results shown in the following Table I:

catalyst weights in Table I are corrected to the volatile-free basis except the immersed particle density. All tests were made on the powder containing the amounts of carbon and total volatile listed in the table except the cracking test, which was made on aliquots of the fractions burned off

TABLE I

*Used silica-alumina inspections of separated fractions— tetrabromethane-methanol solvent*

| | Wt. Percent of Total | Cracking Test | | Density (gm./ml.) | | | | Carbon Content, Wt. Percent | Total Volatile, Wt. Percent | Surface Area, sq. meters/gm. |
|---|---|---|---|---|---|---|---|---|---|---|
| | | Activity, IRA | Carbon Factor | Skeleton | Evacuated Particle | Immersed Particle [1] | Bulk | | | |
| Original | 100 | 26.4 | 1.17 | 2.34 | 1.44 | | 0.77 | 2.23 | 4.25 | 77 |
| Fraction: | | | | | | | | | | |
| 1 | 7.27 | 3.7 | 2.52 | 2.43 | 2.12 | 2.24 | 1.20 | 0.49 | 1.39 | 9 |
| 2 | 3.98 | 26.8 | 1.51 | 2.27 | 1.37 | 1.98 | 0.78 | 1.40 | 3.39 | 76 |
| 3 | 6.19 | 28.6 | 1.43 | 2.34 | 1.34 | 1.97 | 0.76 | 1.20 | 3.82 | 84 |
| 4 | 6.20 | 29.0 | 1.70 | 2.30 | 1.36 | 1.97 | 0.74 | 1.32 | 2.78 | 79 |
| 5 | 13.12 | 29.4 | 1.66 | 2.25 | 1.33 | 1.95 | 0.73 | 1.06 | 3.82 | 82 |
| 6 | 11.31 | 37.8 | 1.37 | 2.24 | 1.36 | 1.95 | 0.74 | 1.60 | 4.40 | 94 |
| 7 | 19.00 | 34.8 | 1.46 | 2.32 | 1.35 | 1.93 | 0.74 | 1.58 | 3.35 | 102 |
| 8 | 5.30 | 36.0 | 1.48 | 2.25 | 1.38 | 1.92 | 0.72 | 1.58 | 3.90 | 106 |
| 9 | 7.52 | 38.8 | 1.53 | 2.27 | 1.45 | 1.93 | 0.72 | 2.30 | 4.60 | 85 |
| 10 | 6.87 | 46.7 | 1.40 | 2.28 | 1.51 | 1.92 | 0.72 | 3.21 | 6.50 | 108 |
| 11 | 6.92 | 40.8 | 1.21 | 2.21 | 1.57 | 1.90 | 0.71 | 3.21 | 5.80 | 84 |
| 12 | 6.32 | 14.8 | 1.45 | 2.14 | 1.64 | 1.84 | 0.86 | 0.87 | 2.04 | 39 |
| Weighted Average | 100 | 31.4 | 1.55 | 2.28 | 1.46 | | 0.76 | 1.62 | 3.81 | 82 |
| Control | 100 | 30.7 | 1.43 | 2.33 | 1.43 | | 0.75 | 1.66 | 3.67 | 95 |

[1] Liquid density at 50% sunk in tetrabromethane-isopropanol.

The powder was mixed with about 1 liter of methanol plus 2 liters of tetrabromethane and the composition then adjusted by adding more methanol to give about 5% (bulk volume) sunk in a centrifuge tube test at room temperature. The slurry was settled overnight in separatory funnels. The sunk layer was then withdrawn and the floated layer was reslurried with additional liquid adjusted to lower density and the process repeated until eleven fractions had been sunk and separated. These eleven fractions and the last floated layer were washed with methanol to remove acetylene tetrabromide, then with water to remove methanol and then dried at 300° F. under vacuum. A "control" was prepared by treating a portion of the original catalyst with the solvent for several hours, then washing and drying in the same manner as the separated fractions.

The "original" catalyst used for this separation was obtained from the stripper standpipe of a fluid catalyst cracking unit and contained coke equivalent to 2.23 per cent carbon (catalyst ash basis) and had a total volatile content (2300° F.) of 4.25 per cent. Part of this "coke" was soluble in the separating liquids as is shown by the 1.6 per cent carbon in the control sample and in the weighted average of the fractions. The surface area was determined by adsorption of nitrogen at about −320° F. The "evacuated particle density" is the density determined by subserging evacuated particles in mercury. It was determined by measuring the volume of mercury displaced by a weighed sample of the material when evacuated and submerged in mercury under a pressure of 7 to 14 atmospheres. The pores in the catalyst particles are less than one micron diameter and hence are not penetrated by mercury at 14 atmospheres. Therefore the displaced volume is constant above a pressure sufficient to fill the openings to the inter-particle spaces. The skeleton density was determined by measuring the volume of helium gas displaced by the sample after evacuation at room temperature. The helium probably fills an appreciable volume of pores which are too small to be entered by the methanol or acetylene tetrabromide. All densities and catalyst weights in Table I are corrected to the volatile-free basis except the immersed particle density. All tests were made on the powder containing the amounts of carbon and total volatile listed in the table except the cracking test, which was made on aliquots of the fractions burned off by calcining for four hours at 1000° F. in a dry stream of air.

The separated fractions show that in this case the high density particles have very low activity and that there is a wide range of activity and moderate range of densities among the particles.

The mechanism of the separation is believed to be as follows: The particles of fresh catalyst are highly porous and have a large surface area on the walls of these pores. Upon repeated regeneration, the loss of activity is accompanied by decreases in pore volume and internal surface and by shrinkage of the individual particles, which indicates that the principal deactivation process occurring in the commercial unit consists of the gradual collapse of the pores. Another deactivation process, which usually occurs to a smaller extent, is the complete or partial blocking of pores by sealing. Upon immersion in the separating liquid, the pores are full of gas (air) but liquid quickly fills the pores to which it has access, compressing the gas by capillary action so that, in effect, pores to which liquid has access are nearly completely filled with liquid. Appropriate light liquids are preferentially adsorbed by the surface so that in a short time the liquid inside the particle has an appreciably different composition from the interstitial liquid. Depending on the relative adsorbability of the light and heavy components of the liquid, the liquid in the particle may have a substantially lower density than the surrounding liquid. Inasmuch as the immersed particle density is the weighted average density of the mineral skeleton, the included liquid, and the trapped gas, and as the more active particles have the greater surface area and pore volume, they are preferentially less dense than the less active particles.

Upon inspection of the data of Table I, it will be seen that the heaviest particles (Fraction 1, 7.27% of whole) have a very low activity of 3.7 compared to 31 activity for the whole. However, the highest activity (46.6) occurs not at the lowest density (Fraction 12) but at fraction 10, whereas fraction 12 has a moderately low activity of 14.8 IRA. Upon further investigation this is shown to be due to the second deactivation process mentioned above, namely, blocking of pores by sealing. In addition to other evidence for this, it was found that nearly all the particles of fraction 12 contained trapped coke that could not be removed by extended burning. These particles had a black color even after prolonged heating in oxygen at 1200° F. and only released the coke when the skeleton was dissolved away with HF.

In the case of used catalyst like the material in this example, the plant scale separation can be advantageously conducted so as to remove the light dead particles as well as the dense dead particles. The powder is slurried with the light liquid containing only enough heavy liquid to float the lightest (dead) particles. After these have been separated for discard more heavy liquid is added to float all but the densest (dead) particles, which are separated for discard, and the floated live particles comprising about 85–90 per cent of the catalyst are recovered for reuse.

A sample of used Filtrol catalyst was separated into six fractions large enough for the cracking test, using separatory funnels analogous to the separation shown above. In this case isopropanol-tetrabromethane was used as the separating liquid. The results are given in Table II and the float-and-sink curve from the small-scale centrifuge tube experiment used to pilot this separation is shown in Figure 2.

TABLE II

*Inspections of separated fractions of used Filtrol catalyst by float-and-sink method—tetrabromethane-isopropanol mixtures*

|  | Wt. Percent | Activity, IRA | Coke Factor |
|---|---|---|---|
| Control | 100 | 26.5 | 1.78 |
| Fraction: |  |  |  |
| 1 | 5.32 | 0.7 | 7.94 |
| 2 | 9.00 | 4.2 | 3.21 |
| 3 | 15.21 | 12.1 | 2.88 |
| 4 | 34.19 | 26.4 | 2.76 |
| 5 | 27.44 | 24.9 | ¹ 6.23 |
| 6 | 8.83 | 22.5 | ¹ 5.76 |
|  | 99.99 |  |  |

¹ Contaminated with iron by rusting of the can used for slurrying. This rusting occurred only with the last two fractions.

The use Filtrol contained a larger proportion of dead catalyst than the used Si—Al previously described. As before, the "control" was prepared by extracting a portion of the catalyst with the solvent, washing, and drying.

Additional combinations of light and heavy liquids were investigated in centrifuge tube experiments using 3-gram portions of the same used Filtrol catalyst. These data are presented in Figure 2, where glacial acetic acid, aniline, and toluene, as well as isopropanol were paired with tetrabromethane and isopropanol was paired with bromoform and carbon tetrabromide. In the case of carbon tetrabromide, a solid at room temperature, the experiment was run at 149° F. (65° C.)

It was attempted to use ethylene dibromide to separate used Filtrol catalyst but the mixtures were too light at 77° F. and the particles did not become light enough to float more than 4 per cent. However, a test on Si—Al catalyst with ethylene dibromide using ethanol did float more than 50 per cent. Similarly, mixtures at 77° F. of isopropanol with methyl iodide were too light and floated only a maximum of 27.5 per cent.

We have described our invention principally as it is applied to the treatment of used catalyst but it can also be applied to the separation of inactive material from new catalyst, either synthetic or natural. In the manufacture of catalysts, some particles are unavoidably damaged while natural catalysts are relatively non-homogeneous. Separation by our process can be used for grading to provide catalysts of greater homogeneity.

Having thus described our invention what we claim is:

1. The process of separating partially spent catalyst into a fraction of relatively high activity and a fraction of relatively low activity which comprises dispersing the catalyst in a liquid medium comprising a major proportion of a halogenated organic solvent having a density higher than the density of the catalyst, said halogenated organic solvent consisting essentially of a member of the group consisting of acetylene tetrabromide, methylene bromide and tetrabromethane, and a minor proportion of an oxygenated organic solvent miscible with said halogenated solvent and which is more highly adsorbed on said catalyst than is said halogenated solvent, said oxygenated organic solvent consisting essentially of a member of the group consisting of methanol, ethtanol, isopropanol, acetone, furfural, ethyl acetate and glacial acetic acid, and recovering by flotation a fraction of catalyst of relatively high activity.

2. The process of claim 1 wherein the catalyst contains a deposit of coke from a hydrocarbon conversion reaction.

3. The process of claim 1 wherein the catalyst is an acid-treated clay.

4. The process of claim 1 wherein the catalyst is an inorganic oxide.

5. The process of claim 1 wherein separation of active and inactive catalyst is effected by settling the said suspension.

6. The process of claim 1 wherein separation of active and inactive catalyst is effected by centrifuging the said suspension.

7. The process of claim 1 wherein the flotation of active catalyst particles is increased by adjusting the density of the liquid medium following the dispersing of the catalyst in the liquid by adding to the liquid medium an additional quantity of said oxygenated organic solvent.

8. The process of separating partially spent catalyst into a fraction of relatively high activity and a fraction of relatively low activity which comprises dispersing the catalyst in a liquid medium comprising a major proportion of a halogenated organic solvent having a density higher than the density of the catalyst, said halogenated organic solvent consisting essentially of a member of the group consisting of acetylene tetrabromide, methylene bromide and tetrabromethane, and a minor proportion of a second oxygenated organic solvent miscible with said halogenated solvent and which is more highly adsorbed on said catalyst than is said halogenated solvent, said oxygenated organic solvent consisting essentially of a member of the group consisting of methanol, ethanol, isopropanol, acetone, furfural, ethyl acetate and glacial acetic acid, adjusting the composition of the liquid medium change the density so as to effect precipitation of the inactive catalyst particles and flotation of the active catalyst particles, and recovering the active fraction from the liquid medium of adjusted composition.

9. The process of claim 8 wherein said second solvent is a water soluble oxygenated compound.

10. The process of claim 8 wherein the partially spent catalyst is first contacted with the halogenated organic solvent and the second solvent is added gradually until the desired fractionation of catalyst is obtained.

11. The process of claim 8 wherein the second organic solvent is initially contacted with the partially spent catalyst and the halogenated organic solvent is added until the desired active catalyst fraction is floated.

12. The process of separating partially spent catalyst into a fraction of relatively high activity and a fraction of relatively low activity which comprises dispersing the catalyst in a liquid medium comprising a major proportion of a halogenated organic solvent consisting essentially of tetrabromethane having a density higher than the density of the catalyst and a minor proportion of an oxygenated organic solvent miscible with said halogenated solvent and which is more highly adsorbed on said catalyst than is said halogenated solvent and consisting essentially of isopropanol, adjusting the composition of the liquid medium to change the density thereof so as to effect precipitation of the inactive catalyst particles and flotation of the active catalyst particles, and recovering the active fraction from the liquid medium of adjusted composition.

References Cited in the file of this patent

UNITED STATES PATENTS

| Number | Name | Date |
|---|---|---|
| 2,132,484 | Kober | Oct. 11, 1938 |
| 2,150,899 | Alexander | Mar. 21, 1939 |
| 2,426,398 | Lathrop | Aug. 26, 1947 |
| 2,483,372 | Payne | Sept. 27, 1949 |
| 2,508,867 | Rampino | May 23, 1950 |
| 2,567,207 | Hoge | Sept. 11, 1951 |
| 2,631,968 | Peery | Mar. 17, 1953 |
| 2,643,215 | Hoge | June 23, 1953 |

OTHER REFERENCES

Sullivan: Bureau of Mines Tec. Paper #381, 1927, pp. 11 and 12.

Houdry Pioneer, vol. 3, #1, May 1948.